July 20, 1937. P. L. COUFFIGNAL 2,087,534
METHOD AND APPARATUS FOR DETERMINING THE UNBALANCE OF ROTATING BODIES
Filed May 25, 1934

Inventor:
Pierre Louis Couffignal
Attorneys:
Bailey & Larson

UNITED STATES PATENT OFFICE 2,087,534

METHOD AND APPARATUS FOR DETERMINING THE UNBALANCE OF ROTATING BODIES

Pierre Louis Couffignal, Brest, France

Application May 25, 1934, Serial No. 727,570
In France June 1, 1933

5 Claims. (Cl. 73—51)

The present invention relates to method and apparatus for determining the unbalance of rotating bodies, for example, such as rotors.

The object of the invention is to provide a method and device that is more efficient and accurate than those used up to the present time.

According to the present invention, in order to measure the phase difference between the movements of two mechanical organs having the same period of movement I arrange an electric circuit in such a manner that current can flow through said circuit only when said organs occupy simultaneously well determined relative positions with respect to contacts provided in said circuit, and I move at least one of said contacts until current flows periodically through the circuit, the corresponding relative positions of said contacts then permitting to determine the phase difference.

Besides this chief characteristic feature, my invention further includes other characteristics which relate more specifically to methods and devices for determining the phase difference between the rotary movement of additional loads carried by the rotor of a machine and the reciprocating oscillatory movement of bearings supporting said rotor.

One of these features consists, when the device in question includes a contact or cursor movable along a graduated circle, in making this circle of two portions which are so mounted that they can be brought exactly into the position in which the center of said circle coincides with the axis of revolution of the rotor to be balanced.

Other features of the present invention will result from the following detailed description thereof.

A preferred embodiment of the device according to the present invention will be hereinafter described with reference to the accompanying drawing, given merely by way of example, and in which.

Figure 1:
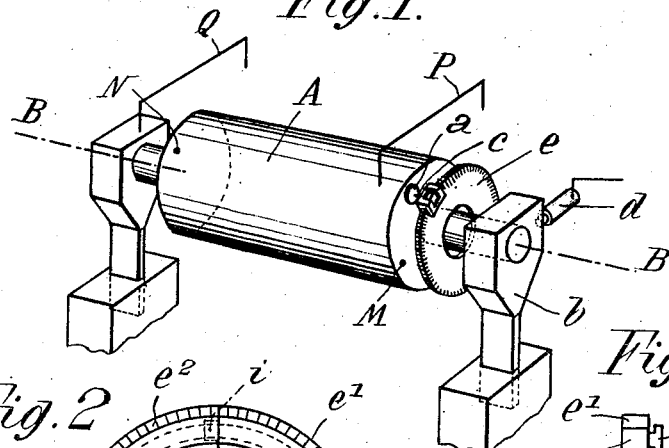
Fig. 1 is a diagrammatical perspective view of a rotor with which coacts a device for ensuring its balancing through a method based on the measure of the phase difference between the rotary movement of additional loads suitably disposed on the rotor and the oscillating movement of vibrating bearings, the whole being arranged according to the present invention.

In the embodiment of my invention that will be hereinafter described with reference to the accompanying drawing, in order to balance a rotor A with respect to its axis of revolution B, it is desired to measure the phase difference between the rotary movement of additional masses such as $a$ fixed to the rotor and the oscillating movement of vibrating bearings $b$ which support said rotor.

It is known that a piece rotating about an axis B with a certain angular velocity is equivalent, from a dynamic point of view, to a solid of revolution perfectly balanced with respect to said axis and two punctual masses such as M and N disposed in planes P and Q at right angles to this axis.

In order to determine the position of these masses, which produce the want of balance of the piece, additional masses $a$ suitably disposed in said respective planes are successively fixed to the rotary piece and the angular position of each of said additional masses just when the corresponding vibrating bearing is in a well defined position, for instance in one of its positions of maximum amplitude, is determined. The position of the punctual masses that cause the rotary piece to be unbalanced can be deduced from the value of the angles thus obtained.

It is important that the device for measuring these angles, or differences of phase, should be very accurate and precise.

According to the present invention, this device includes an electric circuit in which are inserted two contacts adapted to cooperate with one of said additional masses and the corresponding bearing respectively so as to periodically touch them. This circuit is so arranged as to be closed only when both of said contacts simultaneously touch said additional mass and the corresponding bearing respectively. At least one of the contacts is movable so that it can be brought into a position in which this condition is fulfilled, and this contact moves along a graduated scale so that it is possible to measure its position with respect to the other contact.

For instance, as shown in the drawing, the contact $d$ that coacts with the vibrating bearing $b$ is stationary, while the contact $c$ that coacts with additional mass $a$ is adapted to slide along a graduated circle $e$ adapted to be in perfectly coaxial relation with respect to axis B.

The means for causing current to flow through the electric circuit above referred to when additional mass $a$ and vibrating bearing $b$ both coact simultaneously with their respective contacts or pointers may be of different kinds.

I may, for instance, cause said elements $a$ and $b$ to come into contact with elements $c$ and $d$ respectively when they move past them, the whole being inserted in series in the electric circuit above referred to.

The means for revealing the passage of current through the electric circuit may of course be of any kind whatever.

These means may for instance consist of a lamp $f$ inserted in said circuit, for instance a neon tube, or any other indicating means.

As for the vibrating bearings that support the rotor, they may be made of any kind whatever, and advantageously as will be hereinafter described.

The device above described works in the following manner:

The rotor is caused to rotate and the position of contact $d$ is so adjusted that it may be touched by the vibrating bearing for instance when said bearing is at one end of its vibratory stroke. Contact or cursor $c$ is then caused to slide along graduated circle $e$ until current periodically flows through the electric circuit, causing, for instance lamp $f$ to flash periodically. The graduation of circle $e$ on which cursor $c$ is then located is carefully noted.

This device is capable of giving very high accuracy and precision in spite of the fact that bearing $b$ remains in abutting relation with contact $d$ for a relatively long time. It is easy to read on the graduation of circle $e$ the figures corresponding to the extreme positions of contact $c$ for which current is caused to flow periodically through the electric circuit. The arithmetical mean of these figures gives the value of the angular difference of phase with the maximum of precision.

Figure 4:
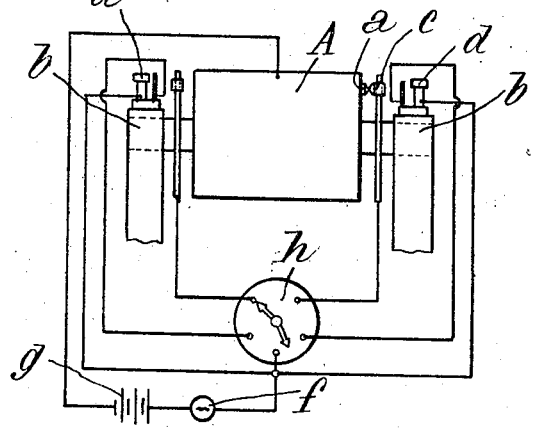
Fig. 4 is a diagram of the electric connections of a device of the kind of that illustrated by Fig. 1.

Of course I can provide devices of the kind above described at both ends of the rotor respectively, so as to permit of making measurements in planes P and Q respectively, according to the arrangement shown by Fig. 4. The two corresponding electric circuits can then be successively connected with battery $g$ and lamp $f$ by means of switch $h$.

Figure 2:
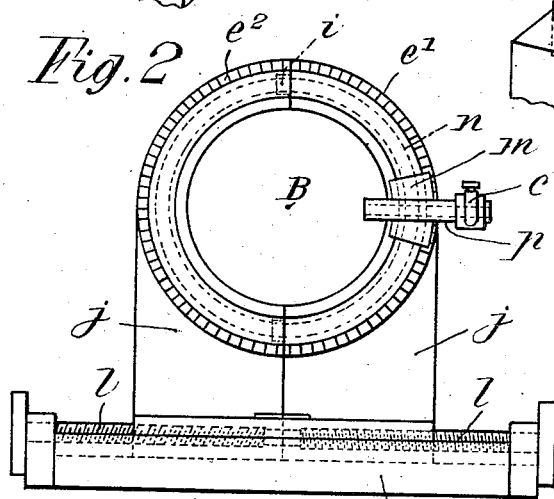
Fig. 2 is an elevational view of some parts of the device for balancing the rotor illustrated by Fig. 1.
Figure 3:
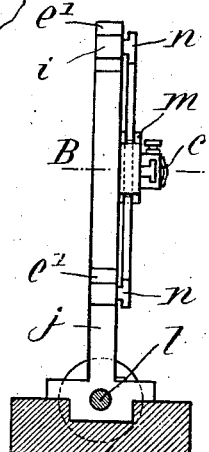
Fig. 3 is a sectional view corresponding to Fig. 2.

The device above described can be further improved by making use of the specific arrangements illustrated by Figs. 2 and 3.

The arrangement of Figs. 2 and 3 relates to circles $e$ of the type above referred to. It should be well understood that the arrangement that will now be described with reference to these Figures 2 and 3 could be applied to all graduated circles cooperating with a cursor carrying a contact in devices of any kind for balancing rotors, even working on different principles, for instance which do not utilize the measurement of phase differences but only some angular measurements.

According to this arrangement, circle $e$ consists of at least two segments mounted in such manner that they can be brought exactly into the position for which the center of said circle coincides with a point of the axis of revolution of said rotor.

For instance, as shown in the drawing, circle $e$ is made of two semi-circular elements $e^1$ and $e^2$ capable of engaging into one another (for instance by means of a mortise and tenon joint $i$) these two elements being carried by supports $j$ capable of sliding with respect to a frame $k$, which supports the whole of the balancing device, the displacements of these parts $j$ being controlled for instance by means of two screws $l$ threaded in opposite directions (Figs. 2 and 3).

The position of the frame itself can be adjusted by means of screws or the equivalent.

In order to permit displacements of contact $c$ with respect to circle $e$, said contact is carried by a cursor $m$, which can for instance be moved along slideways $n$ rigid with elements $e^1$, $e^2$, the position of said contact with respect to the cursor being preferably adjustable. For instance the contact is carried by a sliding rod $p$.

While I have, in the foregoing description, disclosed what I deem to be a preferred and practical embodiment of my invention, it should be well understood that I do not wish to be limited thereto as there might be changes made in the arrangement, disposition, and form of the parts without departing from the principle of the present invention as comprehended within the scope of the appended claims.

What I claim is:

1. A device for determining the unbalance of a rotor, which comprises in combination, a frame, oscillatable bearings for said rotor elastically supported by said frame, a stationary contact adapted to contact one of said bearings for a given position thereof, an additional mass carried by said rotor, a graduated circle coaxially surrounding said rotor, a second contact movable along said circle adapted to contact said mass for a given position of the rotor with respect to said second mentioned contact, an electric circuit including said bearing, said mass and said two contacts in series, a source of current in said circuit, and means for indicating the flow of current through said circuit.

2. A device for determining the unbalance of a rotor, which comprises in combination, oscillatable means having the same period of movement as said rotor, a stationary contact adapted to contact said oscillatable means for a given position thereof, a graduated circle coaxially surrounding said rotating member, a second contact movable along said circle adapted to contact said rotating member for a given position thereof with respect to said second mentioned contact, an electric circuit including said rotating member, said oscillatable means and said two contacts in series, a source of current in said circuit, and means for indicating the passage of current through said circuit.

3. A device for determining the unbalance of a rotor, which comprises in combination, an oscillatable member, a stationary contact adapted to contact said oscillatable member for a given position thereof, a graduated circle consisting of at least two segments movable with respect to the axis of revolution of said rotor, means for accurately positioning said segments in coaxial relation with respect to said axis of revolution, a second contact movable along said graduated circle adapted to contact said rotor for a given position thereof with respect to said second mentioned contact, an electric circuit including said rotor, said oscillatable member and said two contacts in series, a source of current in said circuit, and means for indicating the passage of current through said circuit.

4. A method of determining the unbalance of a rotor which comprises connecting in series a point on said rotor and a point of the bearing of said rotor having a vibratory movement of the same period as the rotor through an electric circuit including two contacts adapted to cooperate with said two points respectively, moving the contact adapted to cooperate with said point on said rotor to a position in which said circuit is closed at the moment when the period of cooperating of the other contact with said point of the bearing is at its one end, then moving said first contact into a position in which said circuit is closed when the period of cooperating of said second contact with said point of the bearing is at its other end, and finally determining the arithmetical mean of the two positions corresponding to the ends of the period for which said second contact cooperates with said point of said bearing.

5. A device for determining the unbalance of a rotor which comprises, in combination, two devices according to claim 2, having a common source of current and common indicating means in their circuits and being arranged at both ends of the rotor respectively, a switch adapted to connect successively the circuit of each device with said common source of current and indicating means.

PIERRE LOUIS COUFFIGNAL.